United States Patent [19]

Nitta

[11] Patent Number: 5,001,760
[45] Date of Patent: Mar. 19, 1991

[54] SPEECH RECOGNITION APPARATUS AND METHOD UTILIZING AN ORTHOGONALIZED DICTIONARY

[75] Inventor: Tsuneo Nitta, Yokohama, Japan

[73] Assignee: Kabushiki Kaisha Toshiba, Kawasaki, Japan

[21] Appl. No.: 254,110

[22] Filed: Oct. 6, 1988

[30] Foreign Application Priority Data

| Oct. 6, 1987 | [JP] | Japan | 62-252106 |
| Oct. 6, 1987 | [JP] | Japan | 62-252107 |
| Oct. 6, 1987 | [JP] | Japan | 62-252108 |
| Oct. 6, 1987 | [JP] | Japan | 62-252109 |

[51] Int. Cl.$^5$ .............................................. G10L 7/08
[52] U.S. Cl. .................................................. 381/43
[58] Field of Search ................................ 381/41–46; 364/513.5

[56] References Cited

U.S. PATENT DOCUMENTS

| 4,624,011 | 11/1986 | Watanabe et al. | 381/43 |
| 4,625,287 | 11/1986 | Matsuura et al. | 381/43 |
| 4,651,289 | 3/1987 | Maeda et al. | 364/513.5 |
| 4,677,672 | 6/1987 | Ukita et al. | 381/43 |
| 4,677,673 | 6/1987 | Ukita et al. | 381/43 |
| 4,718,093 | 1/1988 | Brown | 381/43 |

FOREIGN PATENT DOCUMENTS

| 0059650 | 9/1982 | European Pat. Off. |
| 0076687 | 4/1983 | European Pat. Off. |
| 0094681 | 11/1983 | European Pat. Off. |

OTHER PUBLICATIONS

IEEE International Conference on Acoustics, Speech & Signal Processing, Apr. 10–12, 1978, Tulsa, Okla. M. Ialanko, T. Kohionen "Application of the subspace method to speech recognition" pp. 561–564.

"Application of the Subspace Method to Speech Recognition", Matti Jalanko and Teuvo Kohonen Helsinki University of Technology Department of Technical Physics, 02150, Espoo 15, Finland.

Primary Examiner—Dale M. Shaw
Assistant Examiner—John A. Merecki
Attorney, Agent, or Firm—Oblon, Spivak, McClelland, Maier & Neustadt

[57] ABSTRACT

An orthogonalizing time filter section is arranged in place of a Gram Schmidt orthogonalizing section. The orthogonalizing time filter section is constituted by a plurality of filters for performing smoothing processing and differential processing. The orthogonalizing time filter section obtains an average pattern of acquired learning patterns, and smoothes the average pattern along the time base to obtain a dictionary of a first axis. The section differentiates the average pattern along the time base to obtain a dictionary of a second axis. The above processing is repeated for each category, thus generating an orthogonalized dictionary.

20 Claims, 13 Drawing Sheets

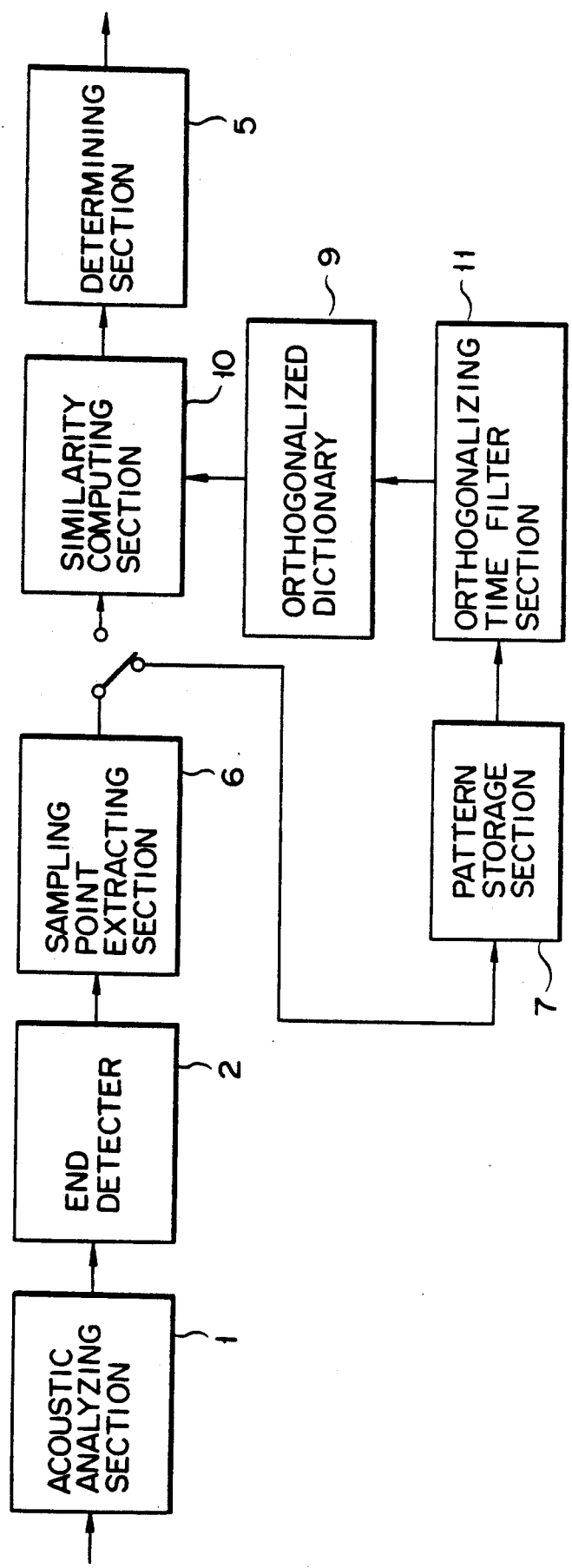
F I G. 3

```
ORTHOGONALIZATION
TIME FILTERING
```

COMPUTE DICTIONARY $b_1(j,k)$ OF FIRST AXIS FROM LEARNING PATTERN $a_m(j,k)$ IN ACCORDANCE WITH $$b_1(j,k) = \frac{1}{3} \sum_{m=1}^{3} \left\{ a_m(j,k-1) + 2 \times a_m(j,k) + a_m(j,k+1) \right\}$$

$[j = 0, 1, ---- 15, \quad k = 0, 1, --- 15]$ NORMALIZE $b_1(j,k)$ AND SET NORMALIZED $b_1(j,k)$ IN ORTHOGONALIZED DICTIONARY ~29

COMPUTE DICTIONARY $b_2(j,k)$ OF SECOND AXIS FROM LEARNING PATTERN $a_m(j,k)$ IN ACCORDANCE WITH $$b_2(j,k) = \frac{1}{3} \sum_{m=1}^{3} \left\{ -a_m(j,k-1) + a_m(j,k+1) \right\}$$

$[j = 0, 1, ---- 15, \quad k = 0, 1, ---- 15]$ NORMALIZE $b_2(j,k)$ AND SET NORMALIZED $b_2(j,k)$ IN ORTHOGONALIZED DICTIONARY ~31

END

ORTHOGONALIZATION TIME FILTERING

COMPUTE AVERAGE PATTERN $A(j,k)$ FROM LEARNING PATTERN $a_m(j,k)$ IN ACCORDANCE WITH $$A(j,k) = \frac{1}{3} \sum_{m=1}^{3} a_m(j,k)$$

$[j = 0, 1, \ldots 15, \quad k = 0, 1, \ldots 15]$ — 33

COMPUTE DICTIONARY $b_1(j,k)$ OF FIRST AXIS IN ACCORDANCE WITH $$b_1(j,k) = A(j,k-2) + 4 \times A(j,k-1) + 6 \times A(j,k) + 4 \times A(j,k+1) + A(j,k+2)$$

$[j = 0, 1, \ldots 15, \quad k = 0, 1, \ldots 15]$, NORMALIZE $b_1(j,k)$ AND SET NORMALIZED $b_1(j,k)$ IN ORTHOGONALIZED DICTIONARY — 35

COMPUTE DICTIONARY $b_2(j,k)$ OF SECOND AXIS IN ACCORDANCE WITH $$b_2(j,k) = -A(j,k-2) - 2 \times A(j,k-1) + 2 \times A(j,k+1) + A(j,k+2)$$

$[j = 0, 1, \ldots 15, \quad k = 0, 1, \ldots 15]$, NORMALIZE $b_2(j,k)$, AND SET NORMALIZED $b_2(j,k)$ IN ORTHOGONALIZED DICTIONARY — 37

COMPUTE DICTIONARY $b_3(j,k)$ OF THIRD AXIS IN ACCORDANCE WITH $$b_3(j,k) = -A(j,k-2) - 2 \times A(j,k-1) + 3 \times A(j,k) - 2 \times A(j,k+1) - A(j,k+2)$$

$[j = 0, 1, \ldots 15, \quad k = 0, 1, \ldots 15]$, NORMALIZE $b_3(j,k)$, AND SET NORMALIZED $b_3(j,k)$ IN ORTHOGONALIZED DICTIONARY — 39

END

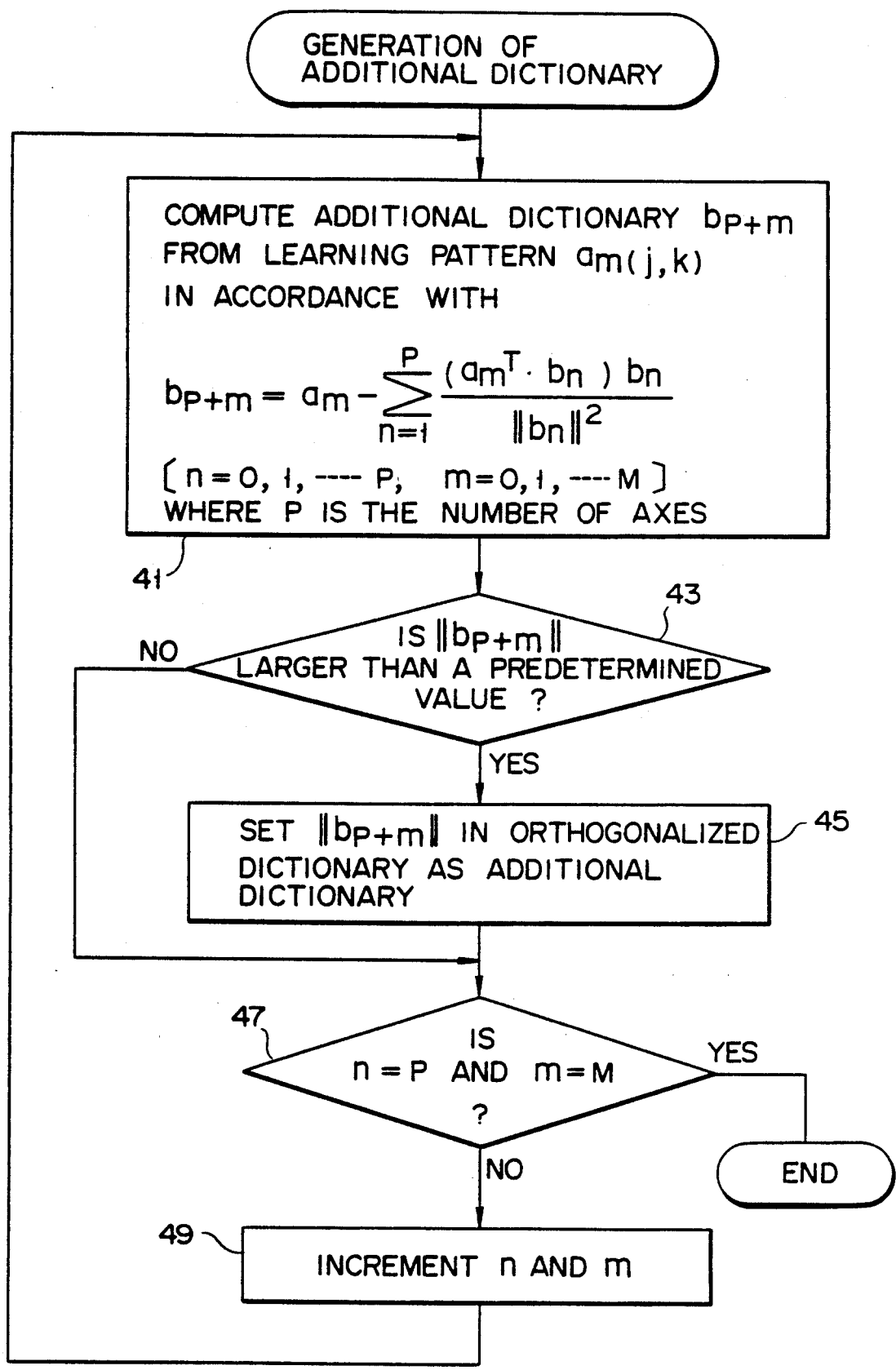
F I G. 9

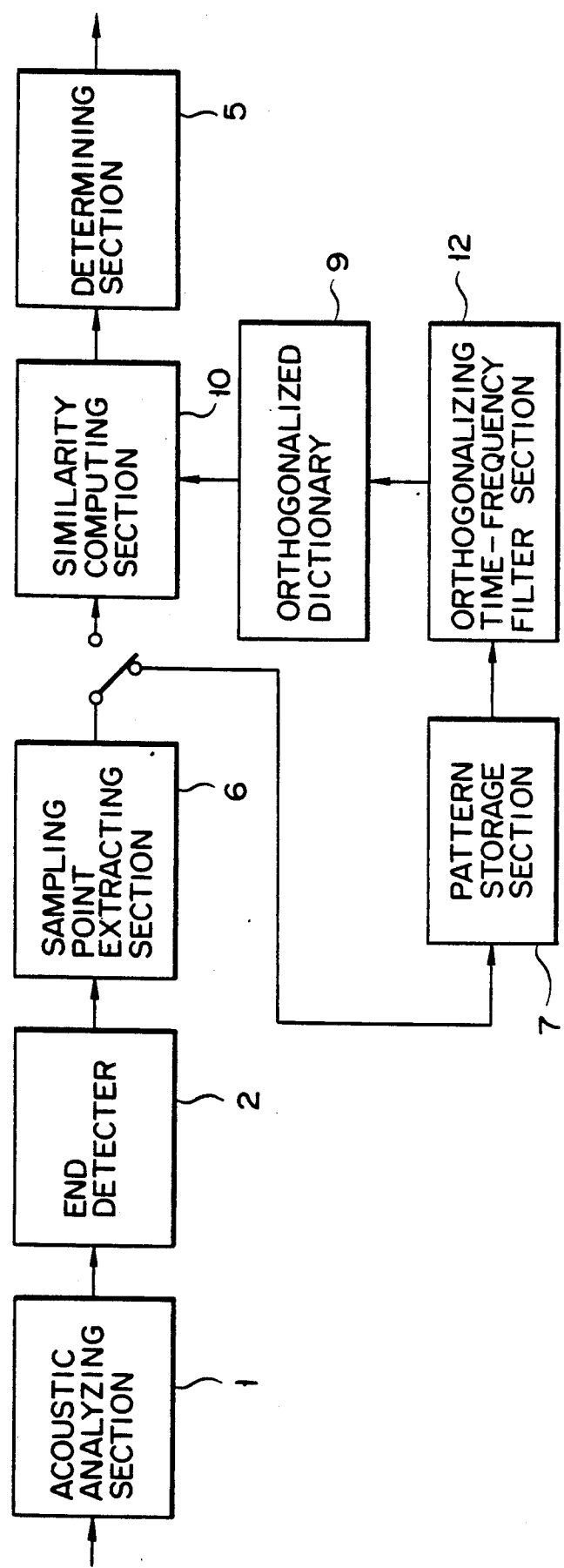
F I G. 11

```
                ┌─────────────────────────────────────┐
                │ ORTHOGONALIZATION TIME·FREQUENCY FILTERING │
                └─────────────────────────────────────┘
                                  │
                                  ▼
```

── 57

COMPUTE AVERAGE PATTERN $A(j,k)$ FROM LEARNING PATTERN $a_m(j,k)$ IN ACCORDANCE WITH $$A(j,k) = \frac{1}{3} \sum_{m=1}^{3} a_m(j,k)$$

$[j = 0, 1, \text{----} 15, \quad k = 0, 1, \text{----} 17]$

── 59

COMPUTE DICTIONARY $b_1(j,k)$ FROM AVERAGE PATTERN $A(j,k)$ IN ACCORDANCE WITH $b_1(j,k) = A(j-1,k-1) + A(j-1,k) + A(j-1,k+1) + A(j,k-1)$
$\qquad + 2 \times A(j,k) + A(j,k+1) + A(j+1,k-1) + A(j+1,k) + A(j+1,k+1)$ $[j = 0, 1, \text{----} 15, \quad k = 0, 1, \text{----} 17]$, NORMALIZE $b_1(j,k)$, AND SET NORMALIZED $b_1(j,k)$ IN ORTHOGONALIZED DICTIONARY

── 61

COMPUTE DICTIONARY $b_2(j,k) = -A(j-1,k-1) + A(j-1,k+1) + \{-A(j,k-1) + A(j,k+1)\}$
$\qquad + \{-A(j+1,k-1) + A(j+1,k+1)\}$ $[j = 0, 1, \text{----} 15, \quad k = 0, 1, \text{----} 17]$, NORMALIZE $b_2(j,k)$, AND SET NORMALIZED $b_2(j,k)$ IN ORTHOGONALIZED DICTIONARY

── 63

COMPUTE DICTIONARY $b_3(j,k)$ OF THIRD AXIS FROM AVERAGE PATTERN $A(j,k)$ IN ACCORDANCE WITH $b_3(j,k) = -A(j-1,k-1) - A(j-1,k) - A(j-1,k+1) + A(j+1,k-1)$
$\qquad + A(j+1,k) + A(j+1,k+1)$ $[j = 0, 1, \text{----} 15, \quad k = 0, 1, \text{----} 17]$, NORMALIZE $b_3(j,k)$, AND SET NORMALIZED $b_3(j,k)$ IN ORTHOGONALIZED DICTIONARY ( END )

FIG. 13

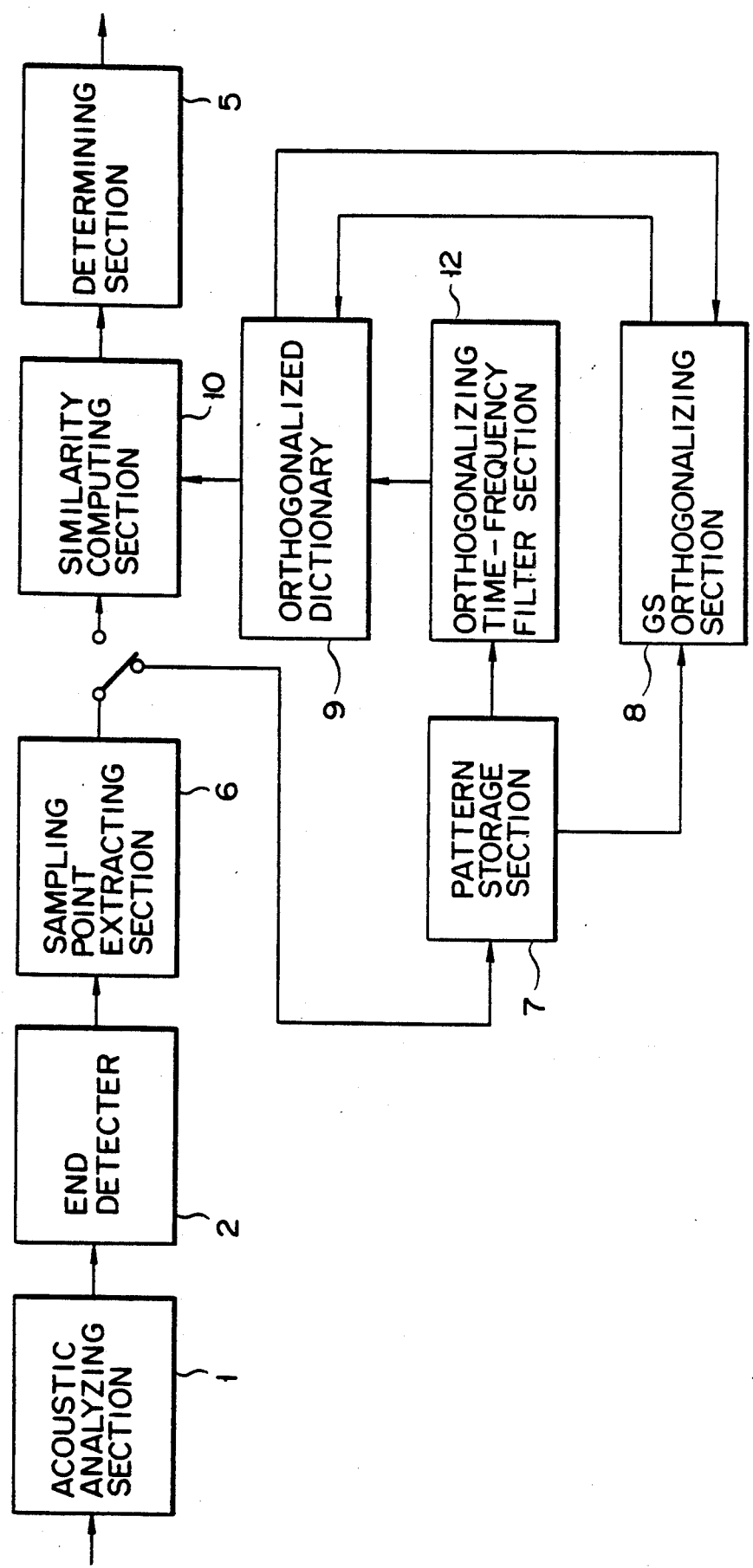
F I G. 14

SPEECH RECOGNITION APPARATUS AND METHOD UTILIZING AN ORTHOGONALIZED DICTIONARY

BACKGROUND OF THE INVENTION

1. Field of the Invention

The present invention relates to a speech recognition apparatus and method capable of obtaining a high recognition capability using a small number of learning patterns.

2. Description of the Related Art

An information I/O operation using speech is very natural to man and is superior in view of a man-machine interface such as provided by a keyboard or the like. For this reason, various speech I/O systems have been studied. Almost all available speech recognition apparatuses use pattern matching for recognizing word speech, and are arranged as shown in FIG. 1.

As shown in FIG. 1, acoustic analyzing section 1 converts an utterance into an electrical signal using a microphone arranged therein, and acoustically analyzes the resulting electrical signal using BPF (band pass filtering) analysis or LPC (Linear Prediction Coding) analysis. Beginning frame/ending frame (end) detector 2 detects a word speech interval of the analyzed signal. Standard pattern dictionary 3 prestores standard patterns of words to be recognized. Pattern matching section 4 computes a similarity or distance between the analyzed signal and the prestored standard patterns of the dictionary 3 (e.g., Euclidean distance, a sum of absolute values in DP (Dynamic Programming) matching, and the like). Determining section 5 determines the recognition results using similarity or distance values computed in pattern matching section 4. For example, section 5 selects a category name of a prestored standard pattern having the highest similarity to the analyzed signal as a recognition result of the input speech.

However, in speech recognition based on the pattern matching method, words can be spoken at a rate different from the rate at which prestored standard patterns are provided. As a result, a displacement (pattern deformation) between an input speech pattern and a prestored standard pattern along a time reference frame or time axis used to correlate the two patterns poses a problem. The conventional system overcomes the displacement along the time axis by linear expansion/compression or nonlinear expansion/compression such as Dynamic Programming.

Furthermore, a subspace method has been proposed. Such a subspace method is described, for example, in IEEE ICASSP'78 (International Conference on Acoustic Speech and Signal Processing, by M. Jalanko and T. Kohonen, pp 561–564 April 1978). In the subspace method, an orthogonalized dictionary is created based on learning patterns acquired in advance, and speech recognition is performed using the created orthogonalized dictionary. FIG. 2 shows the arrangement for performing the subspace method. Acoustic analyzing section 1 and end detector 2 have the same arrangements and functions as those corresponding elements shown in FIG. 1. Sampling point extracting section 6 extracts a predetermined number of sampling data points obtained by equally dividing a word speech interval of the analyzed signal detected by end detector 2, and obtains a standard learning pattern represented by the number of feature vectors x the number of sampling points. A predetermined number of such standard learning patterns are acquired in sets of categories (word recognition, syllable) to be recognized, and are stored in pattern storage section 7. Gram Schmidt orthogonalizing section 8 (hereinafter referred to as "GS orthogonalizing section") creates orthogonalized dictionary 9 using the predetermined number (three or more) of standard learning patterns stored in storage section 7 as described below.

Assume that an mth learning pattern of a given category defined as $a_m$, and learning patterns generated three times are used. The subspace method prepares the orthogonalized dictionary using the operations listed below.

(i) With first learning data $a_1$ defined as dictionary data $b_1$ of a first axis, the following relation is registered in orthogonalized dictionary 9:

$$b_1 = a_1. \tag{1}$$

(ii) The following computation is performed based on second learning data $a_2$ using a GS orthogonalizing equation:

$$b_2 = a_2 - [\{(a_2 \cdot b_1)b_1\}/\|b_1\|^2]. \tag{2}$$

When $\|b_2\|$ is larger than a predetermined value, $\|b_2\|$ is registered in orthogonalized dictionary 9 as $b_2$ of a second axis. In equation (2), (·) indicates an inner product T, and $\|\ \|$ indicates the norm.

(iii) The following computation is performed based on third learning data $a_3$:

$$b_3 = a_2 - \sum_{m=1}^{2} [\{(a_3 T \cdot b_m)b_m\}/\|b_2\|]. \tag{3}$$

When $\|b_3\|$ is larger than a predetermined value, $\|b_3\|$ is registered in orthogonalized dictionary 9 as dictionary data $b_3$ of a third axis. However, if the dictionary data of the second axis is not yet obtained, computation of equation (2) is performed.

Operations (i) through (iii) are performed for each category to prepare dictionary data for the orthogonalized dictionary.

Similarity computing section 10 computes the following equation between each of the dictionary data of the orthogonalized dictionary 9 created as described above and each input speech pattern X:

$$S_i = \sum_{r=1}^{K_i} (X \cdot b_{i,r})^2. \tag{4}$$

As a result, a similarity with each orthogonalized dictionary data $b_{i,r}$ of category i is computed. Input speech pattern X is recognized in accordance with the computed similarity. Note that orthogonalized dictionary data $b_{i,r}$ of category i are normalized in advance. $K_i$ indicates the number of axes of the orthogonalized dictionary data.

However, in the method using the GS orthogonalization, a deviation borne by each orthogonal axis is not clear. More specifically, in orthogonalization, a variety of orthogonal axes can be considered, and a pattern deviation changes depending on the orthogonal axis considered. For this reason, standard patterns represented by dictionary data $\{b_{i,1}, b_{i,2}, b_{i,3}\}$ of Category i of the orthogonalized dictionary computed as described above do not always accurately represent the original standard learning patterns of category i.

SUMMARY OF THE INVENTION

It is an object of the present invention to provide a speech recognition apparatus and method, which can create an orthogonalized dictionary which accurately represents standard patterns with a small number of learning patterns, and can improve recognition performance.

In order to achieve the above object, a speech recognition apparatus comprises acoustic analyzing section for analyzing an input speech to obtain an input speech pattern, and a sampling pattern generating section for generating one of a sampling pattern and a learning pattern by extracting a predetermined number of data samples from the input speech pattern obtained from the acoustic analyzing section. Orthogonalizing time filter section is provided for computing an average pattern from a learning pattern when a learning pattern is generated by the sampling pattern generating section, and for smoothing the average pattern along a time reference axis thereof to generate dictionary data of a first axis and for differentiating the average pattern along the time reference axis to generate dictionary data of a second axis, such dictionary data being representative of the learning pattern. Also included is similarity computing section for computing similarities between input speech patterns acoustically analyzed by the acoustic analyzing section and converted into a sampling pattern as generated by the sampling pattern generating section, and the dictionary data of the first and the second axes generated by the orthogonalizing time filter section.

A speech recognition method according to the present invention comprises the steps of: (a) converting an input speech into an electrical signal and acoustically analyzing the electrical signal; (b) detecting a speech interval of the acoustically analyzed electrical signal; (c) extracting a predetermined number of sampling data points from a speech pattern from which the speech interval is detected so as to obtain one of a sampling pattern and a learning pattern; (d) storing a predetermined number of the generated learning patterns for each category i to be recognized wherein i is a positive integer equal to or larger than 1; (e) obtaining an average pattern from the learning patterns of the category i, smoothing the average pattern along a time reference axis thereof to generate dictionary data of a first axis, differentiating the average pattern along the time reference axis to generate dictionary data of a second axis, and differentiating the average pattern along a frequency axis to generate dictionary data of a third axis; (f) storing the dictionary data of the first, second, and third axes, such data being representative of the learning pattern; (g) computing similarities between sampling patterns extracted from a speech pattern and the stored dictionary data of the first, second, and third axes; and (h) recognizing the sampling patterns based on the computed similarities with the stored dictionary data representative of the learning patterns.

According to the speech recognition system of the present invention, the orthogonalized dictionary is generated to absorb a deviation of the speech pattern along the time reference axis thereof. Therefore, speech recognition can be performed without being influenced by the deviation of the input speech pattern along the time axis. As a result, the recognition performance can be improved. Since orthogonalized dictionary 9 is generated using an orthogonalizing time filter, a high-performance orthogonalized dictionary can be efficiently generated with a small number of learning patterns.

Since an additional dictionary, orthogonal to the orthogonalized dictionary, is generated, a pattern deviation other than that along the time axis described above can be efficiently absorbed, and recognition processing can be performed. Thus, the recognition performance can be further improved.

Three or more types of filters are used to obtain an average pattern of acquired learning patterns, and the average pattern is smoothed along both the time axis and the frequency axis, thereby obtaining dictionary data of a first axis. Thus, deviations of a speech pattern along the time axis and the frequency axis can be effectively absorbed. Furthermore, since the average pattern is differentiated along the time axis to obtain dictionary data of a second axis, a displacement of the speech pattern along the time axis can also be effectively absorbed. Since the averaged pattern is differentiated along the frequency axis to obtain dictionary data of a third axis, the displacement of the speech pattern along the frequency axis can be effectively absorbed.

In this manner, since the orthogonalized dictionary absorbs pattern deviations along the time axis and the frequency axis, each dictionary data of a given axis of the orthogonalized dictionary can correspond to displacements caused by the deviations, thus greatly contributing to improvement in recognition performance. In addition, dictionary data of the second and third axes are obtained based on dictionary data of the first axis generated by the average pattern absorbing pattern deviations along the time axis and the frequency axis, thereby generating the orthogonalized dictionary. Thus a pattern deviation borne by each orthogonal axis of the orthogonalized dictionary itself does not become unclear, unlike in the conventional system. As a result, a high-performance orthogonalized dictionary can be generated by effectively using a small number of learning patterns.

The additional dictionary orthogonal to the orthogonalized dictionary is generated, and is added to the orthogonalized dictionary. Therefore, the additional dictionary can effectively absorb pattern deviations other than those along the time axis and the frequency axis described above so as to perform recognition processing. Thus, recognition performance can be greatly improved.

BRIEF DESCRIPTION OF THE DRAWINGS

Other objects and features of the present invention will be apparent from the following description taken in connection with the accompanied drawings, in which:

FIG. 3 is a block diagram showing an embodiment of a speech recognition system according to the present invention;

FIG. 6 is a flow chart showing another processing of the orthogonalizing time filter section shown in FIG. 3;

FIG. 7 is a flow chart showing still another processing of the orthogonalizing time filter section shown in FIG. 3;

FIG. 9 is a flow chart showing processing for generating an additional dictionary in the embodiment shown in FIG. 8;

FIG. 11 is a block diagram showing still another embodiment of a speech recognition system according to the present invention;

FIG. 13 is a flow chart showing another processing of the orthogonalizing time frequency filter section shown in FIG. 11; and FIG. 14 is a block diagram showing still another embodiment of the present invention.

DETAILED DESCRIPTION OF THE PREFERRED EMBODIMENTS

Figure 1:
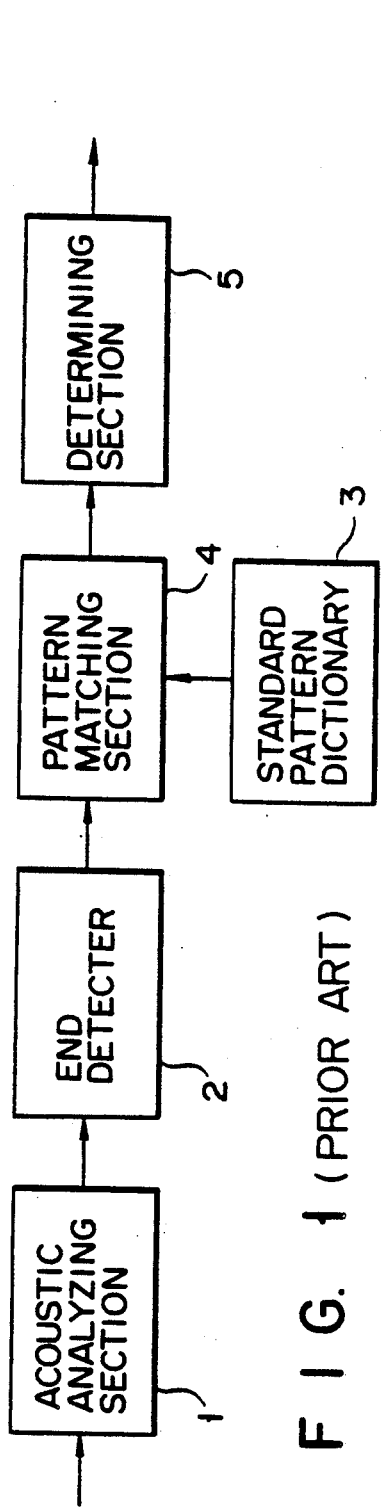
FIG. 1 is a block diagram showing a speech recognition system of a conventional pattern matching method.
Figure 2:
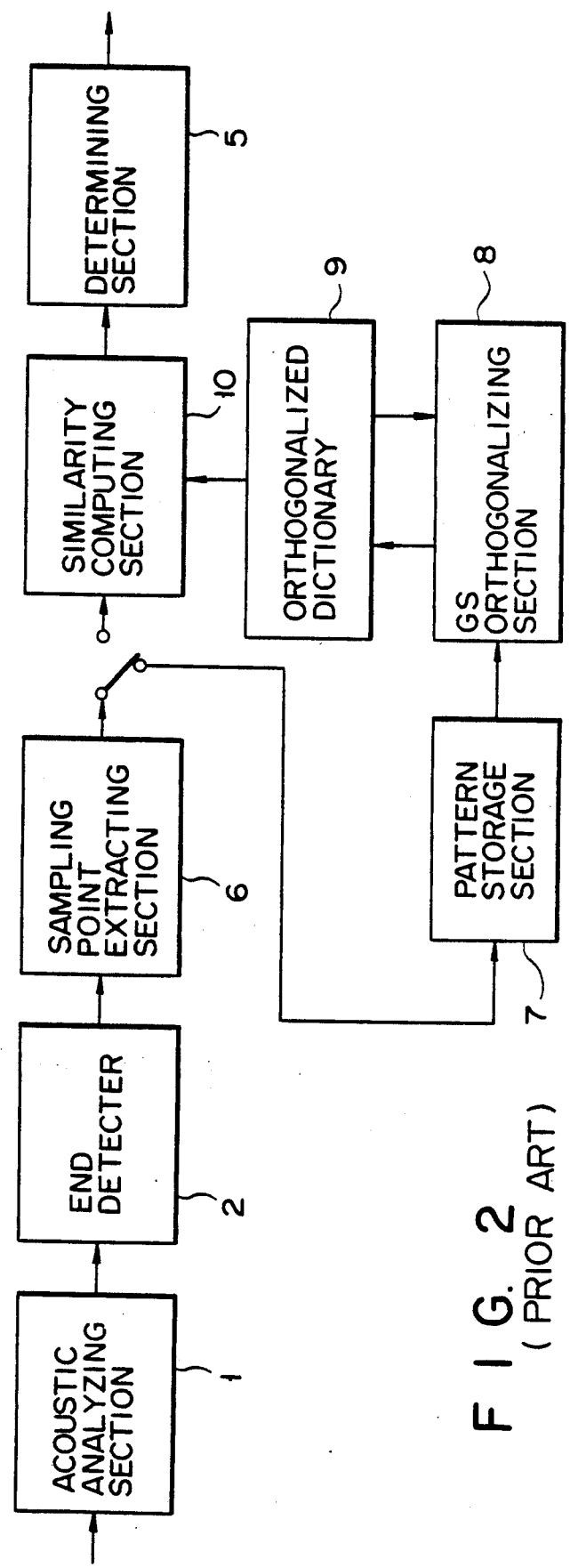
FIG. 2 is a block diagram of a speech recognition system of a conventional subspace method.

FIG. 3 is a block diagram showing an embodiment of a speech recognition system according to the present invention. The same reference numerals in FIG. 3 denote the same parts as in the conventional speech recognition systems shown in FIGS. 1 and 2.

The characteristic feature of this embodiment is use of orthogonalizing time filter section 11 as means for generating an orthogonalized dictionary. In the conventional speech recognition system, orthogonalized dictionary 9 is generated by GS orthogonalizing section 8 of FIG. 2 using learning patterns stored in pattern storage section 7. In this invention, orthogonalizing time filter section 11 is used in place of GS orthogonalizing section 8. Orthogonalizing time filter section 11 is constituted by a plurality of filters for executing at least smoothing processing and differentiating processing, e.g., a plurality of orthogonalizing time filters. Filter section 11 can comprise, e.g., a digital signal processor. Assume that in this embodiment, a learning pattern acquired in pattern storage section 7 is given as a data system which consists of 16 acoustically analyzed feature vectors represented by j (=0, 1, ..., 15), and is sampled at 18 sampling points which equally divide a speech section into 17 subintervals given by k (=0, 1, ..., 16).

If the mth one of three learning patterns which are acquired for category i is given as $a_{m(j,k)}$, filter section 11 generates orthogonalized dictionary 9 as follows. The following description will be made with reference to the flow chart shown in FIG. 4.

First, in step 21, filter section 11 computes average pattern $A_{(j,k)}$, from learning pattern $a_{m(j,k)}$ of category i using equation (5) wherein:

$$A_{(j,k)} = (\tfrac{1}{3}) \sum_{m=1}^{3} a_{m(j,k)};$$

wherein j=0, 1, ..., 15, and k=0, 1, 2, ... 16.  (5)

In step 23, filter section 11 substitutes average pattern $A_{(j,k)}$, computed in step 21, into equation (6) set forth below to compute dictionary data $b_{1(j,k)}$ of the first axis, and registers it in orthogonalized dictionary 9. Dictionary data $b_{1(j,k)}$ can be computed by smoothing average pattern $A_{(j,k)}$ along a time reference frame or axis. Filter section 11 normalizes dictionary data $b_{1(j,k)}$ and registers it as dictionary data of the first axis serving as reference data of orthogonalized dictionary 9.

$$b_{1(j,k)} = A_{(j,k-1)} + 2 * A_{(j,k)} + A_{(j,k+1)}$$

wherein j=0, 1, ..., 15, and k=0, 1, ..., 15.  (6)

In step 25, filter section 11 substitutes average pattern $a_{(j,k)}$ into equation (7), set forth below, to compute dictionary data $b_{2(j,k)}$ of a second axis, and normalizes the computed dictionary data. Thereafter, filter section 11 registers the dictionary data of the second axis in orthogonalized dictionary 9. Dictionary data $b_{2(j,k)}$ can be computed by differentiating average pattern $A_{(j,k)}$ along the time axis.

$$b_{2(j,k)} = -A_{(j,k-1)} + A_{(j,k+1)};$$

wherein j=0, 1, ..., 15, and k=0, 1, ..., 15.  (7)

Figure 5:
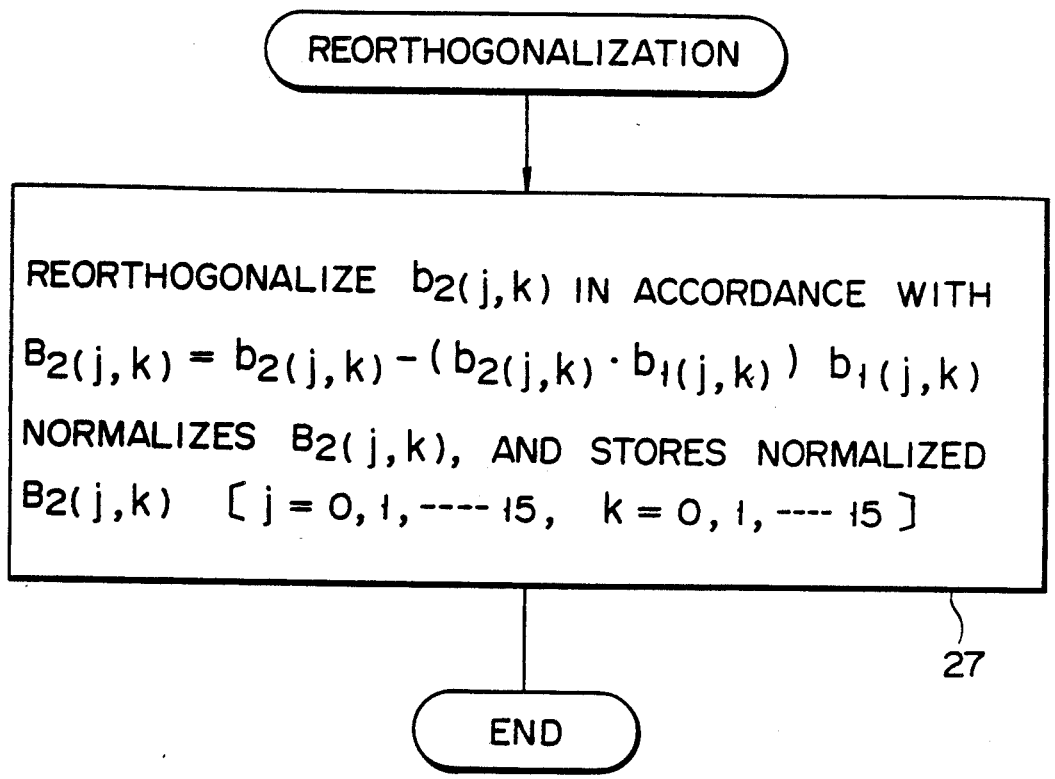
FIG. 5 is a flow chart showing reorthogonalization processing of the orthogonalizing time filter section shown in FIG. 3.

Dictionary data $b_{2(j,k)}$ of the second axis computed in this manner is not perfectly orthogonal to dictionary data $b_{1(j,k)}$ of the first axis. Therefore, reorthogonalization processing in step 27, shown in FIG. 5, can be performed for dictionary data $b_{2(j,k)}$. More specifically, dictionary data $b_{2(j,k)}$ is reorthogonalized using equation (8), set forth below, and reorthogonalized dictionary data $B_{2(j,k)}$ is normalized. Then the normalized data $B_{2(j,k)}$ can be registered in orthogonalized dictionary 9 as the dictionary data of the second axis.

$$B_{2(j,k)} = b_{2(j,k)} - (b_{2(j,k)} \cdot b_{1(j,k)}) b_{1(j,k)}.$$  (8)

However, if such reorthogonalization processing is not performed, satisfactory recognition performance can be obtained using dictionary data $b_{2(j,k)}$ of the second axis computed as described above.

The processing operations in steps 21, 23, and 25 are repetitively executed, thus generating orthogonalized dictionary 9.

FIG. 6 shows another processing method of generating orthogonalized dictionary 9 by filter section 11.

More specifically, in step 29, acquired learning patterns $a_{m(j,k)}$ are substituted in equation (9) set forth below to obtain dictionary data $b_{1(j,k)}$ of the first axis, and the dictionary data is normalized and registered in orthogonalized dictionary 9.

$$b_{1(j,k)} = (\tfrac{1}{3}) \sum_{m=1}^{3} \{(a_{m(j,k-1)} + 2 * a_{m(j,k)} + a_{m(j,k+1)})\};$$

wherein j=0, 1, ..., 15, and k=0, 1, ..., 15.  (9)

Filter section 11 substitutes learning patterns $a_{m(j,k)}$ in equation (10), set forth below in step 31, to compute dictionary data $b_{2(j,k)}$ of the second axis, and registers it in orthogonalized dictionary 9.

$$b_{2(j,k)} = (\tfrac{1}{3}) \sum_{m=1}^{3} \{-a_{m(j,k-1)} + a_{m(j,k+1)}\};$$

wherein j=0, 1, ..., 15, and k=0, 1, ..., 15.  (10)

The processing operations shown in steps 29 and 31 are repeatedly a plurality of times corresponding to the number of categories, thereby generating the orthogonalized dictionary. In the method of generating the orthogonalized dictionary shown in FIG. 6, dictionary, data $b_{1(j,k)}$ of the first axis smoothed along the time axis, and dictionary data $b_{2(j,k)}$ of the second axis, differentiated along the time axis, can be directly calculated from the predetermined number of learning patterns $a_{m(j,k)}$ acquired without temporarily computing average pattern $A_{m(j,k)}$.

In the above description, orthogonalized dictionary 9 is computed up to the second axis. Furthermore, dictionary data of a third axis may, thereafter, be generated by quadratic differentiation, or the like. In this case, a learning pattern obtained by extracting not 18 points, as described above, but 20 points or more can be used.

This case will be explained with reference to the flow chart shown in FIG. 7.

Figure 4:
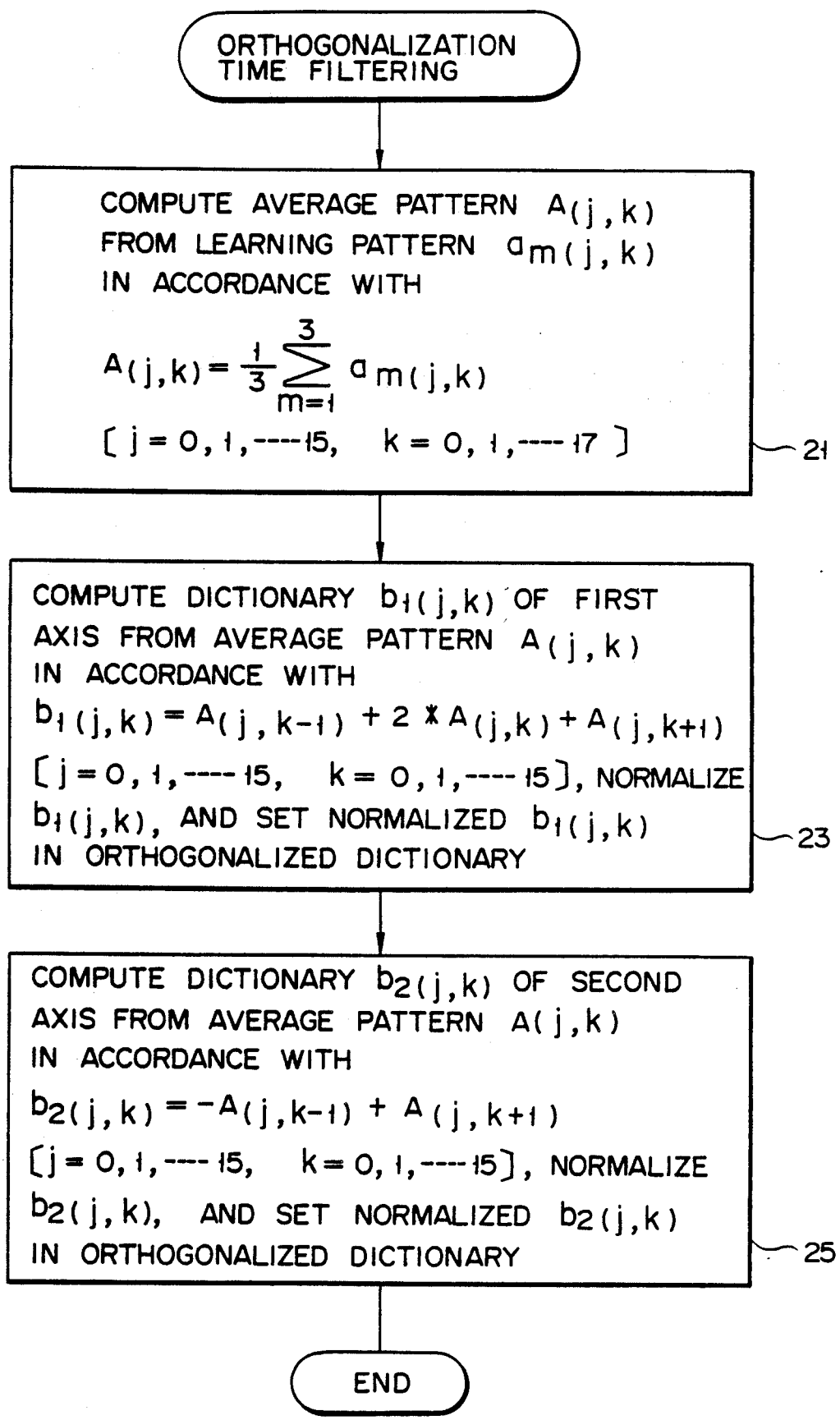
FIG. 4 is a flow chart showing processing of an orthogonalizing time filter section shown in FIG. 3.

In step 33, averaged pattern $A_{(j,k)}$ is computed from learning patterns $a_{m(j,k)}$ of category i using equation (5) as in step 21 shown in FIG. 4.

In step 35, averaged pattern $A_{(j,k)}$ obtained in step 33 is substituted in equation (11), set forth below, to compute dictionary data $b_{1(j,k)}$ of the first axis and the dictionary data is normalized and registered in orthogonalized dictionary 9.

$$b_{1(j,k)} = A_{(j,k-2)} + 4*A_{(j,k-1)} + 6*A_{(j,k)} + 4*A_{(j,k+1)} + A_{(j,k+2)};$$

wherein j=0, 1, ..., 15, and k=0, 1, ..., 15. (11)

In step 37, average pattern $A_{(j,k)}$ is substituted in equation (12), set forth below, to obtain dictionary data $b_{2(j,k)}$ of the second axis.

$$b_{2(j,k)} = -A_{(j,k-2)} - 2*A_{(j,k-1)} + 2*A_{(j,k+1)} + A_{(j,k+2)}$$

wherein j=0, 1, ..., 15, and k=0, 1, ..., 15. (12)

In step 39, average pattern $A_{(j,k)}$ is substituted in equation (13), set forth below, to obtain dictionary data $b_{3(j,k)}$ of the third axis.

$$b_{3(j,k)} = -A_{(j,k-2)} - 2*A_{(j,k-1)} + 3*A_{(j,k)} - 2*A_{(j,k+1)} - A_{(j,k+2)}$$

wherein j=0, 1, ..., 15, and k=0, 1, ..., 15. (13)

Table below shows test data which were obtained such that 30 words of speech data consisting of numeric speech inputs and personal names were acquired 15 times from five males and three females, and the acquired data corresponding to 5 times were used for learning and those corresponding to 10 times were used for evaluating recognition performance.

TABLE

| Method | Object to be Recognized | |
|---|---|---|
| | Numeric + Personal | Numeric |
| Averaging Method | 93.6% | 95.5% |
| Multi template Method | 94.4 | 96.6 |
| Subspace Method 4 axes | 94.3 | 97.3 |
| Differential Orthogonalizing Method 2 axes | 95.4 | 97.6 |
| Differential Orthogonalizing Method 4 axes | 96.1 | 98.3 |

As can be seen from these test data, when an orthogonalized dictionary comprising orthogonalizing time filters is used, recognition performance can be improved more than a case wherein an orthogonalized dictionary is generated by the GS orthogonalizing method.

From the above test data, according to the speech recognition system and method of the present invention, wherein the orthogonalized dictionary is generated using differential filters for compensating for a displacement along the time axis are used so as to perform speech recognition, high recognition performance can be obtained with a small number of learning patterns.

Figure 8:
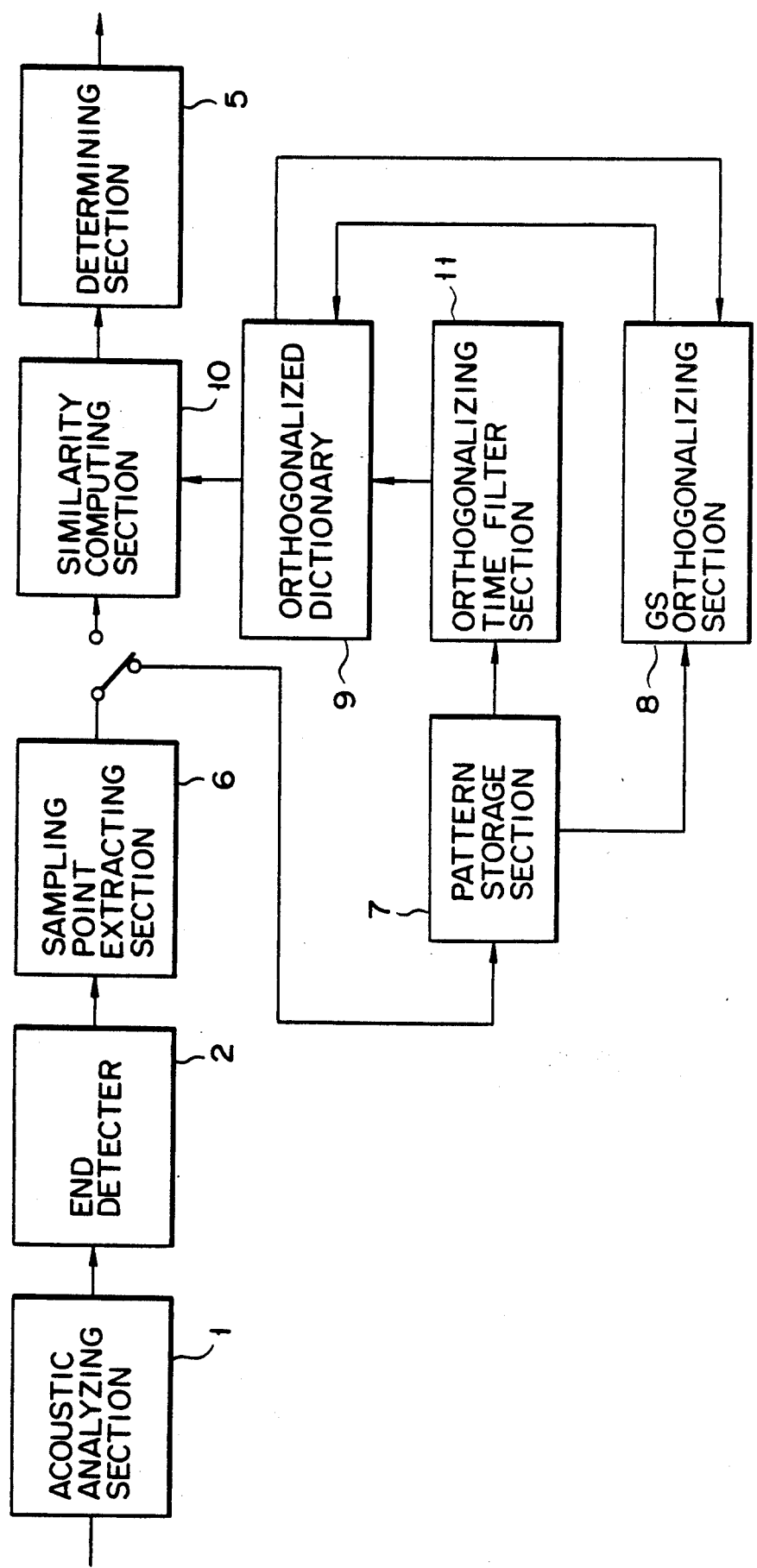
FIG. 8 is a block diagram showing another embodiment of a speech recognition system according to the present invention.

FIG. 8 is a block diagram showing another embodiment of a speech recognition system of the present invention.

The characteristic feature of this embodiment is that a GS orthogonalizing section is arranged in addition to the embodiment shown in FIG. 3, so that dictionary data orthogonal to the orthogonalized dictionary data generated by orthogonalizing time filter section 11 is generated as additional dictionary data, and the additional dictionary data is added to orthogonalized dictionary 9. Note that the same reference numerals in FIG. 8 denote the same parts as in FIG. 3, and a detailed description thereof will therefore be omitted. Processing of GS orthogonalizing section 8 for generating additional dictionary data orthogonal to the date of the orthogonalized dictionary 9 from learning patterns stored in pattern storage section 7 will be described hereinafter with reference to the flow chart shown in FIG. 9.

More specifically, in step 41, section 8 substitutes learning patterns $a_{m(j,k)}$, acquired in pattern storage section 7, into the GS orthogonalizing equation (equation (14)).

$$b_{p+m} = a_m - \sum_{n=1}^{p} [\{(a_m T \cdot b_n) b_n\} / \| b_n \|^2] \quad (14)$$

wherein n=0, 1, ..., p, m=0, 1, ..., M and p is the number of axes of the orthogonalized dictionary.

In step 43, section 8 checks if $\| b_{p+m} \|$ computed in step 41 is larger than a predetermined value. If YES in step 43, $\| b_{p+m} \|$ is registered in orthogonalized dictionary 9 as an additional dictionary.

The processing operations in steps 41, 43, and 45 are respectively executed a plurality of times corresponding to the number of categories.

The additional dictionary data are generated by GS orthogonalizing section 8 in addition to the orthogonalized dictionary data constituted by using orthogonalized time filters, and is registered in the orthogonalized dictionary 9, so that recognition processing can be performed while pattern deviations other than those along the time axis can be effectively absorbed.

Figure 10:
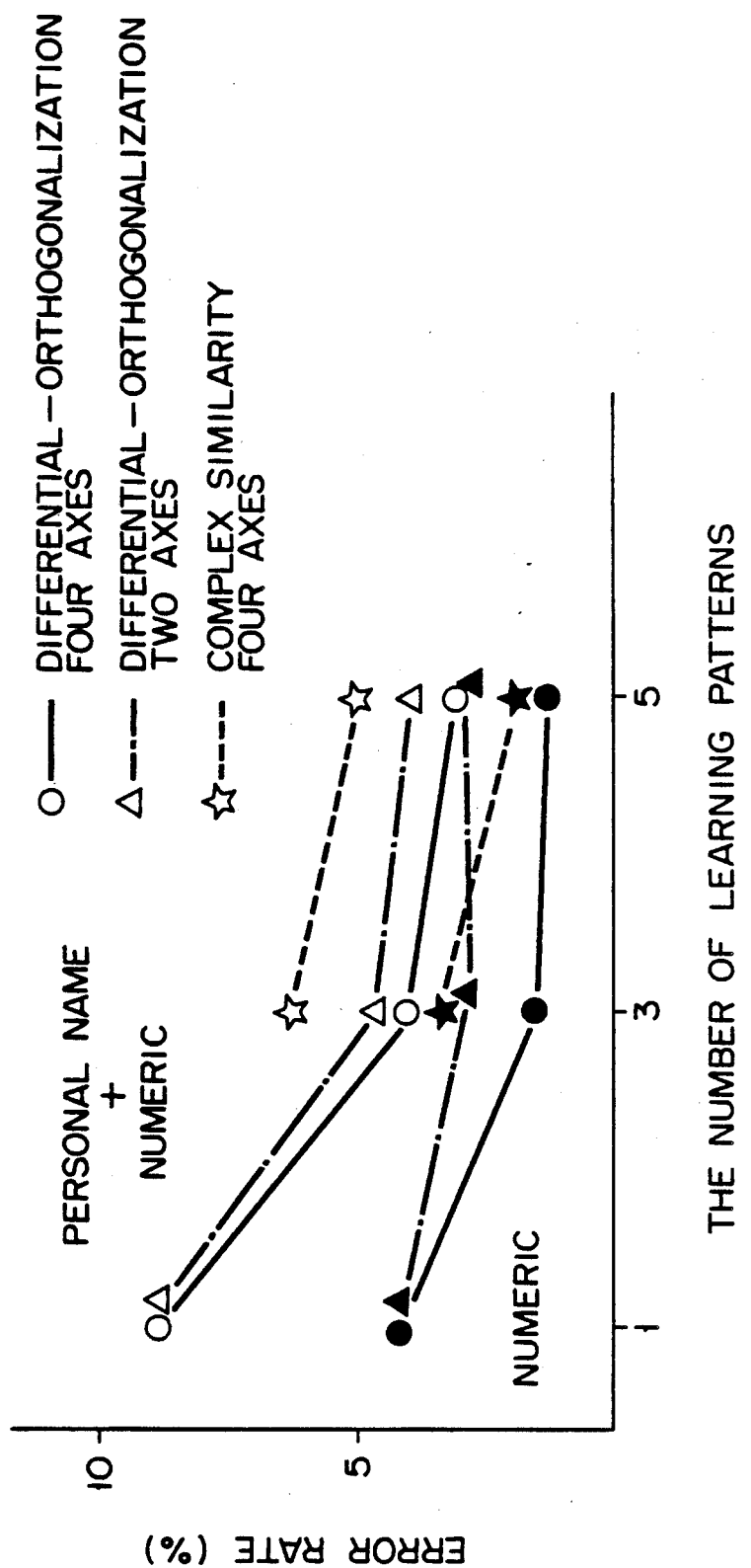
FIG. 10 is a graph showing test samples for evaluating speech recognition performance in the embodiment shown in FIG. 8.

From test data shown in FIG. 10, in the complex similarity method (KL expansion), if the number of times of utterance is increased, a rate of decrease in error rate is larger than that in differentiation/orthogonalization. However, for utterance of about 5 times, the orthogonalized dictionary computed by differentiation/orthogonalization is preferably used since it is superior in view of recognition performance.

FIG. 11 is a block diagram showing still another embodiment of a speech recognition system according to the present invention. The same reference numerals in FIG. 11 denote the same parts as in FIG. 3, and a detailed description thereof will be omitted. The characteristic feature of this embodiment is that orthogonalizing time frequency filter section 12, consisting of three or more types of orthogonalizing time frequency filters, is used in place of orthogonalizing time filter section 11 shown in FIG. 3.

Figure 12:
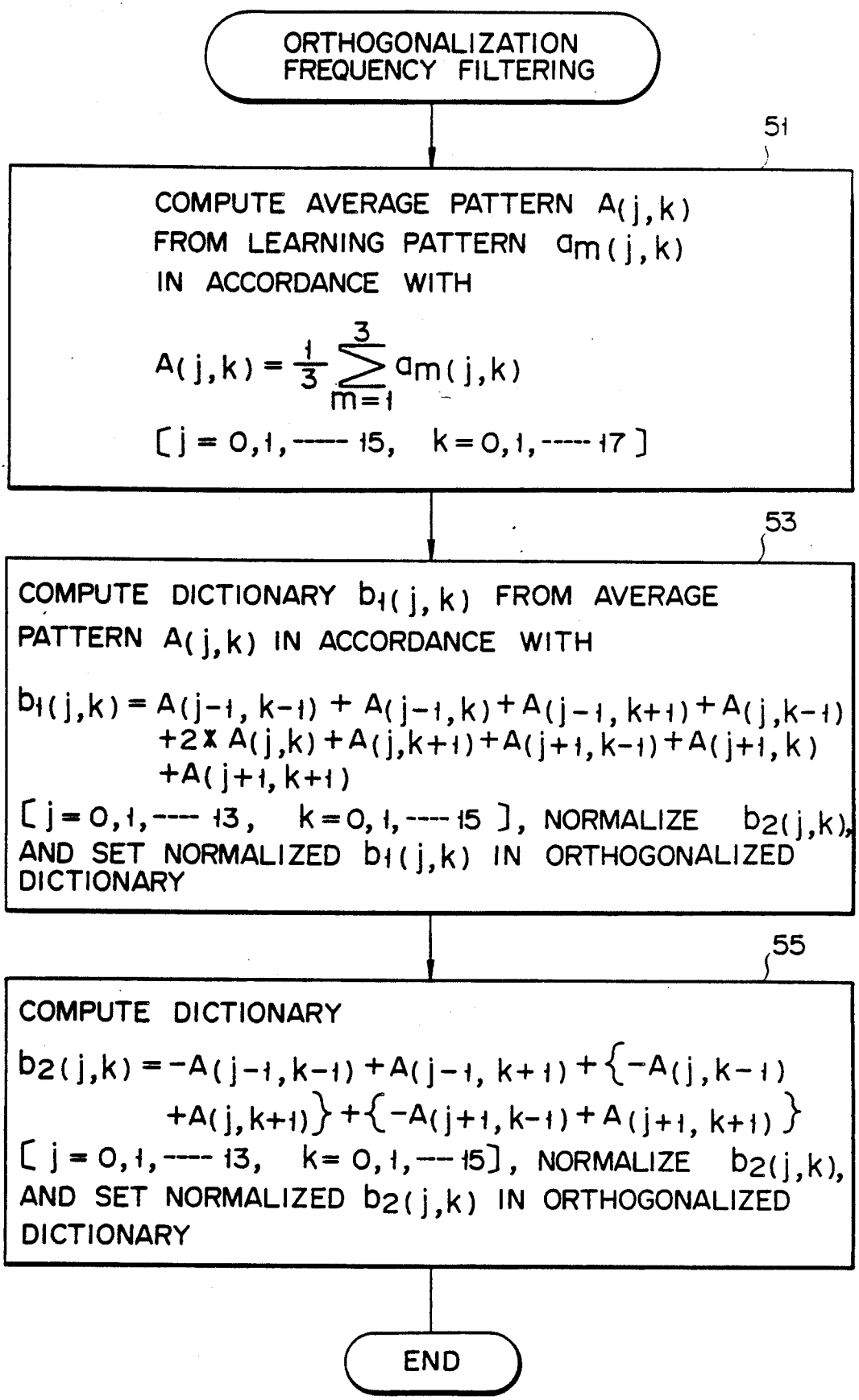
FIG. 12 is a flow chart showing processing of an orthogonalizing time frequency filter section shown in FIG. 11.

Processing of orthogonalizing time frequency filter section 12 for generating an orthogonalized dictionary will be described below with reference to the flow chart shown in FIG. 12.

In step 51, average pattern $A_{(j,k)}$ is computed from learning patterns $a_{m(j,k)}$ of category i as follows:

$$A_{(j,k)} = (\tfrac{1}{3}) \sum_{m=1}^{3} a_{m(j,k)};$$

j=0, 1, 2, ..., 15, and k=0, 1, 2, ..., 17.

In step 53, using average pattern $A_{(j,k)}$ computed as described above, dictionary data $b_{1(j,k)}$ of the first axis is computed as follows:

$$b_{1(j,k)} = A_{(j-1,k-1)} + A_{(j-1,k)} + A_{(j-1,k+1)} + A_{(j,k-1)} + 2*A_{(j,k)} + A_{(j,k+1)} + A_{(j+1,k-1)} + A_{(j+1,k)} + A_{(j+1,k+1)};$$

wherein j=0, 1, ..., 13, and k=0, 1, ..., 15.

The computed dictionary data is normalized and registered in orthogonalized dictionary 9. Dictionary data $b_{1(j,k)}$ is one obtained by smoothing average pattern $A_{(j,k)}$ along the time axis and the frequency axis, and is registered as the dictionary data of the first axis as reference data in orthogonalized dictionary 9.

In step 55, dictionary data $b_{2(j,k)}$ of the second axis is computed using average pattern $A_{(j,k)}$ as follows:

$$b_{2(j,k)} = A_{(j-1,k-1)} + A_{(j-1,k+1)} + \{-A_{(j,k-1)} + A_{(j,k+1)}\} + \{-A_{(j+1,k-1)} + A_{(j+1,k+1)}\}$$

wherein j=0, 1, ..., 13, and k=0, 1, ..., 15.

The computed dictionary data is normalized, and is registered in orthogonalized dictionary 9. Dictionary data $b_{2(j,k)}$ is obtained by differentiating average pattern $A_{(j,k)}$ along the time axis.

Since dictionary data $b_{2(j,k)}$ of the second axis computed in this manner is not perfectly orthogonal to dictionary data $b_{1(j,k)}$ of the first axis, reorthogonalization processing expressed as the following equation can be performed as needed:

$$B_{2(j,k)} = b_{2(j,k)} - (b_{2(j,k)} \cdot b_{1(j,k)}) b_{1(j,k)}.$$

Reorthogonalized dictionary data $B_{2(j,k)}$ can be registered in orthogonalized dictionary 9 as new dictionary data $b_{2(j,k)}$ of the second axis. However, even if such reorthogonalization is not performed, satisfactory recognition performance can be obtained by dictionary data $b_{2(j,k)}$ are obtained as described above.

The processing operations in steps 51, 53, and 55 are repetitively executed for each category, thus generating orthogonalized dictionary 9.

FIG. 13 is a flow chart showing processing of generating an orthogonalized dictionary when the number of axes is 3. Note that steps 57, 59, and 61 in FIG. 13 are the same as steps 51, 53, and 55 in FIG. 12, and a detailed description thereof will be omitted.

In steps 63 in FIG. 13, using average pattern $A_{(j,k)}$, dictionary data $b_{3(j,k)}$ of the third axis is computed by the following equation:

$$b_{3(j,k)} = -A_{(j-1,k-1)} - A_{(j-1,k)} - A_{(j-1,k+1)} + A_{(j+1,k-1)} + A_{(j+1,k)} + A_{(j+1,k+1)}$$

wherein j=0, 1, ..., 13, and k=0, 1, ..., 15.

The computed dictionary data is normalized, and is then registered in orthogonalized dictionary 9.

Dictionary data $b_{3(j,k)}$ is obtained by differentiating average pattern $A_{(j,k)}$ along the frequency axis.

Orthogonalized dictionary 9 can be generated by repeating processing in steps 57, 59, 61, and 63 for each category.

FIG. 14 is a block diagram showing still another embodiment of the present invention.

The characteristic feature of this embodiment is that a GS orthogonalizing section is arranged in addition to the embodiment shown in FIG. 11, so that a dictionary orthogonal to the orthogonalized dictionary generated by orthogonalizing time frequency filter section 12 is generated as an additional dictionary, and is added to the orthogonalized dictionary 9.

Note that the same reference numerals in FIG. 14 denote the same parts as in FIG. 11, and a detailed description thereof will be omitted. The processing of GS orthogonalizing section 8 shown in FIG. 14 is performed using equation (14) in the same manner as that shown in FIG. 8, and a detailed description thereof will be omitted.

What is claimed is:

1. A speech recognition apparatus comprising:
   acoustic analyzing means for analyzing input speech to obtain an input speed pattern;
   sampling pattern generating means for generating one of a learning pattern for storage and a sampling pattern for recognition by extracting a predetermined number of data samples from the input speech pattern obtained from said acoustic analyzing means;
   orthogonalizing time filter means for computing an average pattern from each learning pattern generated by said sampling pattern generating means, and for smoothing the average pattern along a time axis thereof to generate dictionary data of a first axis and for differentiating the average pattern along the time axis thereof to generate dictionary data of a second axis, the dictionary data of the first and second axes being representative of the learning pattern;
   orthogonalized dictionary means for storing dictionary data of the first and second axes generated by said orthogonalizing time filter means; and
   similarity computing and speech recognition means for computing similarities between each input speech pattern acoustically analyzed by said acoustic analyzing means and converted into a sampling pattern by the sampling pattern generating means, and the dictionary data of the first and the second axes generated and stored by said orthogonalizing time filter means to recognize each sampling pattern based on the computed similarities with the dictionary data.

2. An apparatus according to claim 1, wherein said orthogonalizing time filter means computes an average pattern $A_{(j,k)}$ of each of a plurality of learning patterns $a_{m(j,k)}$ of a given category i of the learning patterns $a_{m(j,k)}$ using a data system based on the following equation:

$$A_{(j,k)} = (\tfrac{1}{3}) \sum_{m=1}^{3} (a_{m(j,k)});$$

wherein j represents a number of acoustically analyzed feature vectors of the predetermined number of data samples of the learning pattern, k represents a number of subintervals the learning pattern is divided into by the predetermined number of data samples, and m represents a number of learning patterns of the given category, j and k being positive integers;

obtains dictionary data $b_{1(j,k)}$ of the first axis using the average pattern $A_{(j,k)}$ in accordance with the following equation:

$$b_{1(j,k)} = A_{(j,k-1)} + 2*A_{(j,k)} + A_{(j,k+1)};$$

thereafter, obtains dictionary data $b_{2(j,k)}$, of the second axis using the average pattern $A_{(j,k)}$ in accordance with the following equation:

$$b_{2(j,k)} = -A_{(j,k-1)} + A_{(j,k+1)};$$

and, normalizes dictionary data $b_{2(j,k)}$ of the second axis and registers normalized dictionary data in said orthogonalized dictionary means.

3. An apparatus according to claim 2, wherein said orthogonalizing time filter means performs reorthogonalization processing of the dictionary data of the second axis based on an equation expressed as follows:

$$B_{2(j,k)} = b_{2(j,k)} - (b_{2(j,k)} \cdot b_{1(j,k)}) b_{1(j,k)}$$

normalizes the reorthogonalized dictionary data $B_{2(j,k)}$, and registers the normalized dictionary data in said orthogonalized dictionary means as the dictionary of the second axis.

4. An apparatus according to claim 1, wherein said orthogonalizing time filter means obtains dictionary data $b_{1(j,k)}$ of the first axis from a plurality of learning patterns $a_{m(j,k)}$ of a given category i as follows:

$$b_{1(j,k)} = (\tfrac{1}{3}) \sum_{m=1}^{3} \{(a_{m(j,k-1)} + 2*a_{m(j,k)} + a_{m(j,k+1)}\};$$

wherein j represents a number of acoustically analyzed feature vectors of each learning pattern, k represents a number of subintervals the learning pattern is divided into by the predetermined number of data samples, and m represents a number of learning patterns of the given category, j and k being positive integers;

and, obtains dictionary data $b_{2(j,k)}$ of the second axis expressed by the following equation from each of the learning patterns $a_{m(j,k)}$, and provides dictionary data obtained therefrom to said orthogonalized dictionary means;

$$b_{2(j,k)} = (\tfrac{1}{3}) \sum_{m=1}^{3} \{-a_{m(j,k-1)} + a_{m(j,k+1)}\}.$$

5. An apparatus according to claim 1, wherein said orthogonalizing time filter means obtains dictionary data $b_{1(j,k)}$ of the first axis expressed by the following equation from a plurality of learning patterns $a_{m(j,k)}$ of a given category i:

$$b_{1(j,k)} = A_{(j,k-2)} + 4*A_{(j,k-1)} + 6*A_{(j,k)} + 4*A_{(j,k+1)} + A_{(j,k+2)};$$

wherein j represents a number of acoustically analyzed feature vectors of each learning pattern, k represents a number of subintervals the learning pattern is divided into by the predetermined number of data samples, and m represents a number of learning patterns of the given category, j and k being positive integers;

obtains dictionary data $b_{2(j,k)}$ of the second axis expressed as:

$$b_{2(j,k)} = -A_{(j,k-2)} - 2*A_{(j,k-1)} + 2*A_{(j,k+1)} + A_{(j,k+2)};$$

and, quadratically differentiates the dictionary data of the second axis based on the following equation to generate dictionary data $b_{3(j,k)}$ of a third axis:

$$b_{3(j,k)} = -A_{(j,k-2)} - 2*A_{(j,k-1)} + 3*A_{(j,k)} - 2*A_{(j,k+1)} - A_{(j,k+2)}.$$

6. A speech recognition apparatus comprising:
speech converting means for converting input speech into an electrical signal;
acoustic analyzing means for acoustically analyzing the electrical signal;
speech interval detecting means for detecting a speech interval of the acoustically analyzed electrical signal;
sampling pattern generating means for extracting a predetermined number of sampling data points from a speech pattern of the speech interval detected by said speech interval detecting means so as to obtain one of a sampling pattern for recognition and a learning pattern for storage;
sampling pattern storage means for storing a predetermined number of learning patterns generated by said sampling pattern generating means for a given category i of learning patterns wherein i is a positive integer equal to or larger than 1;
orthogonalizing time filter means for computing an average pattern from each of the learning patterns of the given category i, and for smoothing the average pattern along a time reference axis thereof to generate dictionary data of a first axis and differentiating the average pattern along the time axis thereof to generate dictionary data of a second axis;
orthogonalized dictionary means for storing the dictionary data of the first and second axes generated by said orthogonalizing time filter means from the learning patterns;
orthogonalizing means for generating additional dictionary data orthogonal to dictionary data of the first and second axes stored by orthogonalized dictionary means from learning patterns stored in the sampling pattern storage means and for adding the additional dictionary data to said orthogonalized dictionary means;
similarity computing means for computing similarities between each of the sampling patterns generated by the sampling pattern generating means and the dictionary data of the first and second axes stored in said orthogonalized dictionary means; and
sampling pattern recognizing means for recognizing each of the sampling patterns based on similarities with the dictionary data of said orthogonalized dictionary means computed by said similarity computing means.

7. An apparatus according to claim 6, wherein said orthogonalizing means generates the dictionary orthogonal to said orthogonalized dictionary means by Gram Schmidt orthogonalization.

8. An apparatus according to claim 6, wherein said orthogonalizing time filter means computes an average pattern $A_{(j,k)}$ of each of a plurality of learning patterns $a_{m(j,k)}$ of the give category i using a data system based on the following equation:

$$A_{(j,k)} = (\tfrac{1}{3}) \sum_{m=1}^{3} a_{m(j,k)};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers;

obtains dictionary data $b_{1(j,k)}$ of the first axis using the average pattern $A_{(j,k)}$ in accordance with the following equation:

$$b_{1(j,k)} = A_{(j,k-1)} + 2^*A_{(j,k)} + A_{(j,k+1)};$$

thereafter, obtains dictionary data $b_{2(j,k)}$ using the average pattern $A_{(j,k)}$ in accordance with the following equation $$b_{2(j,k)} = -A_{(j,k-1)} + A_{(j,k+1)};$$

and, normalizes the dictionary data $b_{2(j,k)}$ of the second axis and registers the normalized dictionary data in said orthogonalized dictionary means.

9. An apparatus according to claim 8, wherein said orthogonalizing time filter means performs reorthogonalization processing of the dictionary data of the second axis based on an equation expressed as follows:

$$B_{2(j,k)} = b_{2(j,k)} - (b_{2(j,k)} \cdot b_{1(j,k)}) b_{1(j,k)}$$

normalizes the reorthogonalized dictionary data $B_{2(j,k)}$, and registers the normalized dictionary data in said orthogonalized dictionary means as the dictionary of the second axis.

10. An apparatus according to claim 6, wherein said orthogonalizing time filter means obtains dictionary data $b_{1(j,k)}$ of the first axis from learning patterns $a_{m(j,k)}$ of the given category i as follows:

$$b_{1(j,k)} = (\tfrac{1}{3}) \sum_{m=1}^{3} \{(a_{m(j,k-1)} + 2^*a_{m(j,k)} + a_{m(j,k+1)})\};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers;

and, obtains dictionary, data $b_{2(j,k)}$ of the second axis, expressed by the following equation, from each learning pattern $a_{m(j,k)}$, and provides the dictionary data obtained therefrom in said orthogonalized dictionary means:

$$b_{2(j,k)} = (\tfrac{1}{3}) \sum_{m=1}^{3} \{-a_{m(j,k-1)} + a_{m(j,k+1)}\}.$$

11. An apparatus according to claim 6, wherein said orthogonalizing time filter means obtains dictionary data $b_{1(j,k)}$ of the first axis expressed by the following equation from learning patterns $a_{m(j,k)}$ of the given category i:

$$b_{1(j,k)} = A_{(j,k-2)} + 4^*A_{(j,k-1)} + 6^*A_{(j,k)} + 4^*A_{(j,k+1)} + A_{(j,k+2)};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers;

obtains dictionary data $b_{2(j,k)}$ of the second axis expressed as:

$$b_{2(j,k)} = -A_{(j,k-2)} - 2^*A_{(j,k-1)} + 2^*A_{(j,k+1)} + A_{(j,k+2)};$$

and, quadratically differentiates the dictionary data of the second axis based on the following equation to generate dictionary data $b_{3(j,k)}$ of a third axis:

$$b_{3(j,k)} = -A_{(j,k-2)} - 2^*A_{(j,k-1)} + 3^*A_{(j,k)} - 2^*A_{(j,k+1)} - A_{(j,k+2)}.$$

12. A speech recognition apparatus comprising:
speech converting means for converting input speech into an electrical signal;
acoustic analyzing means for receiving the electric signal from said speech converting means and acoustically analyzing the electrical signal;
speech interval detecting means for detecting a speech interval of the acoustically analyzed electrical signal;
sampling pattern generating means for extracting a predetermined number of sampling data points from a speech pattern of the speech interval detected by said speech interval detecting means so as to obtain one of a sampling pattern for recognition and a learning pattern for storage;
sampling pattern storage means for storing a predetermined number of learning patterns generated by said sampling pattern generating means for a given category i of learning patterns wherein i is a positive integer equal to or larger than 1;
orthogonalizing time-frequency filter means, comprising at least three types of filters, for obtaining an average pattern from each of the learning patterns of the given category i, smoothing the average pattern along a time reference axis thereof to generate dictionary data of a first axis, differentiating the average pattern along the time axis to generate dictionary data of a second axis, and differentiating the average pattern along a frequency axis thereof to generate dictionary data of a third axis;
orthogonalized dictionary means for storing the dictionary data of the first, second, and third axes generated by said orthogonalizing time-frequency filter means;

similarity computing means for computing similarities between each of the sampling patterns generated by said sampling pattern generating means and the dictionary data of the first, second, and third axes stored in said orthogonalized dictionary means; and sampling pattern recognizing means for recognizing each of the sampling patterns based on similarities with the dictionary data of the first, second and third axes as computed by said similarity computing means.

13. An apparatus according to claim 12, wherein said orthogonalizing time-frequency filter means obtains average pattern $A_{(j,k)}$ from a plurality of learning patterns $a_{m(j,k)}$ of the given category i using the following equation:

$$A_{(j,k)} = (\tfrac{1}{3}) \sum_{m=1}^{3} a_{m(j,k)};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers;

obtains dictionary data $b_{1(j,k)}$ of the first axis using the following equation:

$$b_{1(j,k)} = A_{(j-1,k-1)} + A_{(j-1,k)} + A_{(j-1,k+1)} + A_{(j,k-1)} + 2 \cdot A_{(j,k)} + A_{(j,k+1)} + A_{(j+1,k-1)} + A_{(j+1,k)} + A_{(j+1,k+1)};$$

obtains dictionary data $b_{2(j,k)}$ of the second axis using the following equation:

$$b_{2(j,k)} = -A_{(j-1,k-1)} + A_{(j-1,k+1)} + \{(-A_{(j,k-1)} + A_{(j,k+1)})\} + \{(-A_{(j+1,k-1)} + A_{(j+1,k-1)})\};$$

obtains dictionary data $b_{3(j,k)}$ of the third axis using the following equation:

$$b_{3(j,k)} = -A_{(j-1,k-1)} - A_{(j-1,k)} - A_{(j-1,k+1)} + A_{(j+1,k-1)} + A_{(j+1,k)} + A_{(j+1,k+1)};$$

and normalizes the dictionary data of the first, second, and third axes, and registers the normalized dictionary data in said orthogonalized dictionary means.

14. An apparatus according to claim 13, wherein said orthogonalizing time-frequency filter means performs reorthogonalization processing of the dictionary data of the second axis based on the following equation:

$$B_{2(j,k)} = b_{2(j,k)} - (b_{2(j,k)} \cdot b_{1(j,k)}) b_{1(j,k)}$$

and registers the reorthogonalized dictionary data $B_{2(j,k)}$ in said orthogonalized dictionary means as new dictionary data $b_{2(j,k)}$ of the second axis.

15. A speech recognition method comprising the steps of:

(a) converting unit speech into an electrical signal and acoustically analyzing the electrical signal;

(b) detecting a speech interval of the acoustically analyzed electrical signal;

(c) extracting a predetermined number of sampling points from a speech pattern of the speech interval detected so as to obtain one of a sampling pattern for recognition and a learning pattern for storage;

(d) storing a predetermined number of learning patterns for a given category i of learning patterns wherein i is a positive integer equal to or larger than 1;

(e) obtaining an average pattern from each of the learning patterns of the given category i, smoothing the average pattern along a time reference axis thereof to generate dictionary data of a first axis, differentiating the average pattern along the time axis thereof to generate dictionary data of a second axis, and differentiating the average pattern along a frequency axis thereof to generate dictionary data of a third axis;

(f) storing the dictionary data of the first, second, and third axes;

(g) computing similarities between each of the sampling patterns and the stored dictionary data of the first, second, and third axes; and (h) recognizing the sampling patterns based on the computed similarities with the stored dictionary data.

16. A method according to claim 15, wherein the step (e) comprises obtaining average pattern $A_{(j,k)}$ for each of the learning patterns $a_{m(j,k)}$ of the given category i using the following equation:

$$A_{(j,k)} = (\tfrac{1}{3}) \sum_{m=1}^{3} a_{m(j,k)};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers; obtaining dictionary data $b_{1(j,k)}$ of the first axis using the following equation:

$$b_{1(j,k)} = A_{(j-1,k-1)} + A_{(j-1,k)} + A_{(j-1,k+1)} + A_{(j,k-1)} + 2 \cdot A_{(j,k)} + A_{(j,k+1)} + A_{(j+1,k-1)} + A_{(j+1,k)} + A_{(j+1,k+1)};$$

obtaining dictionary data $b_{2(j,k)}$ of the second axis using the following equation:

$$b_{2(j,k)} = -A_{(j-1,k-1)} + A_{(j-1,k+1)} + \{-A_{(j,k-1)} + A_{(j,k+1)}\} + \{-A_{(j+1,k-1)} + A_{(j+1,k-1)}\};$$

obtaining dictionary data $b_{(j-1,k)}$ of the third axis using the following equation:

$$b_{3(j,k)} = -A_{(j-1,k-1)} + A_{(j-1,k)} - A_{(j-1,k+1)} + A_{(j+1,k-1)} + A_{(j+1,k)} + A_{(j+1,k+1)};$$

and, normalizing the dictionary data of the first, second, and third axes.

17. A method according to claim 16, wherein the step (e) further comprises performing reorthogonalization processing of the dictionary data of the second axis based on the following equation:

$$B_{2(j,k)} = b_{2(j,k)} - (b_{2(j,k)} \cdot b_{1(j,k)}) b_{1(j,k)};$$

and generating reorthogonalized dictionary data $B_{2(j,k)}$ as new dictionary data $b_{2(j,k)}$ of the second axis.

18. A speech recognition apparatus comprising:
speech converting means for converting input speech into an electrical signal;
acoustic analyzing means for receiving the electrical signal from said speech converting means and acoustically analyzing the electrical signal;
speech interval detecting means for detecting a speech interval of the acoustically analyzed electrical signal;
sampling pattern generating means for extracting a predetermined number of sampling points from a speech pattern of the speech interval detected by said speech interval detecting means so as to obtain one of a sampling pattern for recognition and a learning pattern for storage;
sampling pattern storage means for storing a predetermined number of learning patterns generated by said sampling pattern generating means for a given category i of the learning patterns wherein i is a positive integer equal to or larger than 1;
orthogonalizing time-frequency filter means, comprising at least three types of filters, for obtaining an average pattern from each of the learning patterns of the given category i, smoothing the average pattern along a time reference axis thereof to generate dictionary data of a first axis, differentiating the average pattern along the time axis to generate dictionary data of a second axis, and differentiating the average pattern along a frequency axis thereof to generate dictionary data of a third axis;
orthogonalized dictionary means for storing the dictionary data of the first, second, and third axes generated by said orthogonalizing time-frequency filter means;
orthogonalizing means for generating additional dictionary data orthogonal to dictionary data stored by the orthogonalized dictionary means from learning patterns stored in the sampling pattern storage means and for adding said additional dictionary data to said orthogonalized dictionary means;
similarity computing means for computing similarities between each of the sampling patterns generated by said sampling pattern generating means and the dictionary data of the first, second, and third axes stored in said orthogonalized dictionary means; and
sampling pattern recognizing means for recognizing each of the sampling patterns based on similarities with the dictionary data stored by the orthogonalized dictionary means computed by said similarity computing means.

19. An apparatus according to claim 18, wherein said orthogonalizing time-frequency filter means obtains average pattern $A_{(j,k)}$ from learning patterns $a_{m(j,k)}$ of the given category i using the following equation:

$$A_{(j,k)} = (\tfrac{1}{3}) \sum_{m=1}^{3} a_{m(j,k)};$$

wherein j represents a number of acoustically analyzed feature vectors of the sampling data points of the learning pattern, k represents a number of subintervals the learning pattern is divided into by the predetermined number of sampling data points, and m represents a number of learning patterns of the given category i, j and k being positive integers;

obtains dictionary data $b_{1(j,k)}$ of the first axis using the following equation:

$$b_{1(j,k)} = A_{(j-1,k-1)} + A_{(j-1,k)} + A_{(j-1,k+1)} + A_{(j,k-1)} + 2 \cdot A_{(j,k)} + A_{(j,k+1)} + A_{(j+1,k-1)} + A_{(j+1,k)} + A_{(j+1,k+1)};$$

obtains dictionary data $b_{2(j,k)}$ of the second axis using the following equation:

$$b_{2(j,k)} = -A_{(j-1,k-1)} + A_{(j-1,k+1)} + \{-A_{(j,k-1)} + A_{(j,k+1)}\} + \{-A_{(j+1,k-1)} + A_{(j+1,k+1)}\};$$

obtains the dictionary $b_{3(j,k)}$ of the third axis using the following equation:

$$b_{3(j,k)} = -A_{(j-1,k-1)} - A_{(j-1,k)} + A_{(j-1,k+1)} + A_{(j+1,k-1)} + A_{(j+1,k)} + A_{(j+1,k+1)};$$

and normalizes the dictionary data of the first, second, and third axes, and registers normalized dictionary data in said orthogonalized dictionary means.

20. An apparatus according to claim 19, wherein said orthogonalizing time-frequency filter means performs reorthogonalization processing of the dictionary data of the second axis based on the following equation:

$$B_{2(j,k)} = b_{2(j,k)} - (b_{2(j,k)} \cdot b_{1(j,k)}) b_{1(j,k)}$$

and registers reorthogonalized dictionary data $B_{2(j,k)}$ in said orthogonalized dictionary means as new dictionary data $b_{2(j,k)}$ of the second axis.

* * * * *